United States Patent
Branz et al.

(10) Patent No.: US 10,074,181 B2
(45) Date of Patent: Sep. 11, 2018

(54) METHOD AND DEVICE FOR MONITORING A SURROUNDING REGION OF A VEHICLE, AND METHOD FOR IMPLEMENTING EMERGENCY BRAKING

(71) Applicant: Robert Bosch GmbH, Stuttgart (DE)

(72) Inventors: Wolfgang Branz, Ludwigsburg (DE); Christian Danz, Stuttgart (DE); Jorge Sans Sangorrin, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 62 days.

(21) Appl. No.: 14/655,601

(22) PCT Filed: Jan. 14, 2014

(86) PCT No.: PCT/EP2014/050601
§ 371 (c)(1),
(2) Date: Jun. 25, 2015

(87) PCT Pub. No.: WO2014/108561
PCT Pub. Date: Jul. 17, 2014

(65) Prior Publication Data
US 2015/0348270 A1    Dec. 3, 2015

(30) Foreign Application Priority Data
Jan. 14, 2013  (DE) .......................... 10 2013 200 409

(51) Int. Cl.
*G06T 7/00* (2017.01)
*H04N 5/232* (2006.01)
(Continued)

(52) U.S. Cl.
CPC .............. *G06T 7/0042* (2013.01); *B60T 7/22* (2013.01); *G06K 9/00805* (2013.01);
(Continued)

(58) Field of Classification Search
None
See application file for complete search history.

(56) References Cited

U.S. PATENT DOCUMENTS

| | | | | |
|---|---|---|---|---|
| 5,937,079 A | * | 8/1999 | Franke | ................... G06K 9/209 |
| | | | | 348/E13.014 |
| 2012/0081542 A1 | * | 4/2012 | Suk | ..................... G06K 9/00805 |
| | | | | 348/139 |

(Continued)

FOREIGN PATENT DOCUMENTS

DE    43 08 776    9/1993

OTHER PUBLICATIONS

Jung et al. : « Stereo Vision-Based Forward Obstacle Detection », Jan. 1, 2007, XP05549129.

*Primary Examiner* — Mussa A Shaawat
*Assistant Examiner* — Kyung J Kim
(74) *Attorney, Agent, or Firm* — Norton Rose Fulbright US LLP; Gerard Messina (57) ABSTRACT

A method for monitoring a vehicle's surrounding region, includes reading in a distance image pertaining to the surrounding region, the distance image including distance values representing the result of a multiplicity of distance measurements, which are performed with a sensor for stereo image recording based on a method for calculating a stereo disparity map concerning the surrounding region sensed by the sensor. In a selecting, a cut-away portion from the distance image is selected, and in a detecting, an obstacle located in the surrounding region is detected using the distance values included in the cut-away portion. In an ascertaining, a number of relevant distance values is ascertained, which represent distance values included in the cut-away portion that are allocatable to the obstacle. In an ascertaining, a value of an existence measure for the exis- (Continued)

tence of the obstacle is determined, based on the number and quality of relevant distance values.

15 Claims, 3 Drawing Sheets

(51) Int. Cl.
   *B60T 7/22* (2006.01)
   *H04N 13/204* (2018.01)
   *G06K 9/00* (2006.01)
   *G06K 9/20* (2006.01)
   *G06T 7/73* (2017.01)

(52) U.S. Cl.
   CPC .............. *G06K 9/2054* (2013.01); *G06T 7/73* (2017.01); *H04N 5/23229* (2013.01); *H04N 13/204* (2018.05); *G06T 2207/10012* (2013.01); *G06T 2207/30261* (2013.01)

(56) References Cited

U.S. PATENT DOCUMENTS

| 2013/0147922 | A1* | 6/2013 | Nanri | G01C 11/06 348/46 |
| 2014/0205184 | A1* | 7/2014 | Franke | G06K 9/00201 382/154 |

\* cited by examiner

METHOD AND DEVICE FOR MONITORING A SURROUNDING REGION OF A VEHICLE, AND METHOD FOR IMPLEMENTING EMERGENCY BRAKING

FIELD OF THE INVENTION

The present invention relates to a method and a device for monitoring a surrounding region of a vehicle, and to a method for implementing emergency braking of a vehicle.

BACKGROUND INFORMATION

Emergency braking systems based on surround sensors are reaching the market in increasing numbers. Since these involve safety-critical interventions in the vehicle movement, the achievement and verification of very small error rates are essential. This verification can be provided via a sufficient number of hours of representative driving statistics, during which the required sensor data are recorded. However, this involves a high outlay in terms of data acquisition and the required infrastructure for the data recording and subsequent simulation. As a general rule, the representative driving work ranges between a few ten thousand hours, but the necessary number of hours may also be much higher depending on the intervention intensity of the emergency braking system.

SUMMARY OF THE INVENTION

Against this background, the present invention provides a method and a device for monitoring a surrounding region of a vehicle, and a method for implementing emergency braking of a vehicle according to the main claims. Advantageous refinements derive from the respective dependent claims and from the following description.

Using a stereo image recording device, such as a stereo camera, a surrounding region of a vehicle is able to be monitored. The stereo image recording device may be used for a distance measurement, for instance. A distance image generated by the stereo image recording device using known methods for calculating a stereo video disparity map can be employed for detecting an obstacle located in the monitored surrounding region. Only a section of the distance image may be analyzed for detecting the obstacle. This makes it possible to keep the complexity of analyzing a stereo image-recording device low.

A method for monitoring a surrounding region of a vehicle includes the following steps:

Reading in a distance image pertaining to the surrounding region of the vehicle, the distance image including a plurality of distance values that represent the result of a multiplicity of distance measurements carried out by a sensor for stereo image recording and pertaining to the surrounding region of the vehicle sensed by the sensors;

Selecting a cut-away portion from the distance image;

Detecting an obstacle in the surrounding region of the vehicle, using the distance values included in the cut-away portion;

Ascertaining a number and quality of relevant distance values, which represent distance values included in the cut-away portion and are able to be allocated to the obstacle; and determining a value of an existence measure for an existence of the obstacle, based on the number and the quality of relevant distance values.

The distance image may represent an image which is based on known methods for calculating stereo-video disparity maps. In other words, the distance image can be produced or may have been produced using known methods for calculating stereo-video disparity maps. The relevance of a distance value, i.e., whether or not a distance value is considered relevant, may furthermore be defined in that the distance value is deemed relevant if it lies within a distance interval of a defined length. That is so say, as far as the distance values are concerned, it can be checked whether the values lie within the distance interval of a defined length. The quality of a distance value may be a measure of the probability that the distance value does indeed lie within the distance interval. For example, the greater the quality of a distance value, the more it may reliably be assumed that the distance value lies within the distance interval. The quality may also be based on auxiliary parameters, which are ascertainable in the course of the disparity calculation, for instance. The quality may also represent the quality of a distance value or the usability of a distance value for ascertaining the existence of an obstacle. The higher the quality of a relevant distance value, the more it indicates the existence of the obstacle.

The vehicle may be a motor vehicle such as a passenger car, a commercial van or a motorcycle. The surrounding region could be a region located in front of the vehicle in the driving direction, such as a section of road. The sensor for the stereo image recording may be disposed on the vehicle. Data acquired by the sensor are able to be analyzed with the aid of a suitable evaluation device. Each image pixel of the distance image may be assigned a distance value. In this way the distance image can be used for ascertaining a distance between the sensor for stereo image recording and any surrounding region sensed by the sensor for the stereo image recording. A distance image may refer to a list of distance values assigned to an image coordinate and may be in digital form. The distance image or the data representing the distance image can be read in via an interface to the sensor for stereo-image recording or to an evaluation device downstream from the sensor for stereo image recording. The cut-away portion from the distance image may be an area of the distance image that is relevant for detecting the object. The cut-away portion may also be referred to as evaluation window. For example, the cut-away portion may represent an image area of the distance image having a vertical and a horizontal image angle of less than 25°, less than 15°, less than 10°, or less than 5°, for example. With the aid of known evaluation methods, an obstacle situated in the surrounding region is detectable using the distance values contained in the cut-away portion. Detectable in particular is an obstacle that is imaged by the cut-away portion of the image region. The obstacle can be a stationary or mobile object, such as another vehicle, for example. Object detection methods may be used for allocating a distance value to the obstacle. The more distance values of appropriate quality are able to be allocated to the obstacle, the greater the likelihood that the obstacle actually exists. For example, the greater the value of the existence measure, the higher the probability that the obstacle actually exists.

The method may include a step of supplying a warning signal if the value of the existence measure represents the actual presence of the obstacle. For example, the warning signal may be used by a safety system or a driver assistance system of the vehicle.

The method may include a step of checking an emergency braking operation of the vehicle required in order to avoid a collision between the vehicle and the obstacle, utilizing the warning signal. For instance, the warning signal may be employed for checking whether emergency braking is required. The warning signal may also be used for validating an emergency braking signal for triggering emergency braking.

In the step of selecting, a section situated in the center of the distance image may be selected as the cut-away portion. Such a cut-away portion may be fixedly specified. This makes it possible to simplify the analysis of the distance image.

In the step of selecting, an edge of the cut-away portion pointing toward the ground may be selected in such a way that in the presence of an obstacle located at a predefined distance from the sensor, the section detects the obstacle starting from a predefined height above the ground. This makes it possible to consider what is known as collision relevance height. In this way an obstacle that poses a direct risk to the vehicle because of its proximity to the vehicle and its size is detectable by the cut-away portion.

In the step of ascertaining, the value of the existence measure is able to be determined as a function of a relationship between the number and quality of the relevant distance values and a total number of distance values included in the cut-away portion, or a relationship between the number and quality of the relevant distance values and a number of the other distance values included in the cut-away portion. The value can thereby be determined in a very simple and rapid manner. In addition, a further statement about the statistical quality of the existence measure is able to be provided in this way via the number and distribution of the valid distance values, which usually lie in a range of a few thousand.

For example, in the step of ascertaining, the value of the existence measure can be determined in such a way that the value of the existence measure indicates the actual existence of the obstacle if the number of relevant distance values exceeds a threshold value. In the same way, the value of the existence measure can be determined in the step of ascertaining in such a way that the value of the existence measure indicates the actual existence of the obstacle if the relationship between the number of relevant distance values of sufficient quality and a number of the other distance values included in the cut-away portion exceeds a threshold value. A simple threshold value comparison therefore makes it possible to determine whether an obstacle is present. Moreover, a standard deviation is able to be calculated with the aid of the distribution of the valid distance values, which may additionally be utilized as a threshold value for the validity of the existence measure.

The method may include a step of ascertaining a distance with respect to the obstacle, using the relevant distance values. As a result, the distance image may additionally be used for ascertaining the distance between the vehicle and the obstacle.

In the step of ascertaining, a relative velocity between the obstacle and the vehicle is ascertainable with the aid of the distance. For example, multiple distances to the obstacle may be ascertained for this purpose, e.g., based on distance images detected sequentially over time. The relative velocity is able to be determined on the basis of the plurality of distances and the recording instants of the distance images. Information about the relative velocity may be considered in a decision regarding required emergency braking, for example.

For instance, such an approach can be utilized for the system release of an emergency braking system based on validated sensor models or system models on the basis of a smaller data base than the overall data base generated by the stereo-image recording device.

Because of the implemented restrictions and simplifications, such as the definition of an "evaluation window" that is located at the collision relevance height above the road surface, as well as a simple method for ascertaining an existence measure of statistical meaningfulness, interferences in the system, such as caused by environmental influences (rain, fog, snow, etc.), are better able to be modeled with regard to their effective criticalness (e.g., false positives) than would be possible for the entire stereo-image recording range. In this sense, the proposed method for analyzing a stereo-image recording device constitutes a type of emulation of a commonly known sensor system that is simple and easier to validate, i.e., that of a single-beam lidar geometry (see below).

As a result, the driving hours required for the system release can essentially be restricted to the conditions and situations classified as relevant from the model knowledge, or be partially or even completely avoided by the available a priori knowledge. The required model knowledge can be generated theoretically or by a series of selective experiments for ascertaining the system behavior with regard to the relevant interference. As a result, well understood and valid statistical models may be set up, which make it possible to ascertain the system behavior with regard to the stipulated safety objective. In this sense, the validation and release is steered in the direction of the procedure used in ESP or in airbag systems, for instance. In the case of ESP, for example, defined driving maneuver catalogs are checked, which include appropriate extreme scenarios. As a result, large-scale field testing for a system release may now be required only in limited form or, ideally, not at all.

The described procedure constitutes a novelty, since until now models of this type did not exist for driver-assistance systems based on surround sensors that are complex in terms of their evaluation technology, such as video or radar sensor systems, due to the high complexity of the environmental model to be set up and the multitude of shortcomings resulting therefrom. The correspondingly complex models of signal processing chains of driver-assistance usually have inadequacies or specification gaps that do not allow inferences and with regard to the achievement of the appointed safety object. For example, if a radar sensor is used, this complexity stems from the fact that it is impossible to completely model the entire backscatter behavior of all surrounding radar-reflecting objects in all statistically relevant driving situations.

The exception may be driver assistance systems based on surround sensors and featuring very simple measurement and surroundings interpretation principles with regard to a restricted classification task. For example, a single beam lidar may be employed as a surround sensor, in which the classification task "collision-relevant object is located within the driving envelope" is realized by a simple and robust measuring principle that is able to be modeled in a satisfactory manner. Core features may be a "sharp" beam geometry by which an "evaluation window" is realized that lies at a defined collision relevance height above the road surface, as well as a time-of-flight distance measurement. Inadequacies of the measuring principle, which could lead to potential false positives, such as environmental influences or leafy branches that project into the sensor beam, are able to be modeled and analyzed in an excellent manner and are not the result of complex signal processing.

A method for implementing emergency braking of a vehicle in order to avoid a collision or to mitigate the severity of consequences of a collision between the vehicle and an obstacle located in the environment of the vehicle includes the following steps:

Carrying out the steps of a described method for monitoring the surrounding region of the vehicle in order to ascertain a value of an existence measure for an existence of the obstacle; and Implementing the emergency braking operation as a function of the value of the existence measure.

It is therefore possible to realize an evaluation method for the efficient validatability of a stereo-video emergency braking system.

A device for monitoring a surrounding region of a vehicle includes the following features:

A device for reading in a distance image pertaining to the surrounding region of the vehicle, the distance image including a multiplicity of distance values representing the result of a multiplicity of distance measurements, carried out by a sensor for stereo-image recording and pertaining to the surrounding region of the vehicle acquired by the sensor;

A device for selecting a cut-away portion from the distance image;

A device for detecting an obstacle located in the surrounding region of the vehicle with the aid of the distance values included in the cut-away portion;

A device for ascertaining a number and quality of relevant distance values, which represent distance values included in the cut-away portion and are able to be allocated to the obstacle; and A device for ascertaining a value of an existence measure for an existence of the obstacle based on the number and quality of relevant distance values.

The device for ascertaining may furthermore be developed to ascertain the value of the existence measure based on an evaluation of the distance distribution. The distance distribution may represent a distribution of the distance values.

The apparatuses of such a device may be used to implement the steps of said method for monitoring a surrounding region of a vehicle.

A device for implementing emergency braking of a vehicle in order to avoid a collision between the vehicle and an obstacle located in the surrounding region of the vehicle may furthermore include an apparatus for carrying out the emergency braking as a function of the value of the existence measure.

In the present case, a device may be understood to refer to an electrical device which processes sensor signals and outputs control signals and/or data signals as a function thereof. The device may include an interface developed in the form of hardware and/or software. In a hardware implementation, the interfaces may be part of what is commonly known as a system ASIC, for instance, which encompasses a wide variety of functionalities of the device. However, it is also possible for the interfaces to be separate, integrated circuits or to be at least partially made up of discrete components. In a software development, the interfaces may be software modules which, for example, are present on a microcontroller in addition to other software modules.

Also advantageous is a computer program product provided with program code that may be stored on a machine-readable carrier such as a semiconductor memory, a hard-disk memory or an optical memory, and used for implementing the method according to one of the specific embodiments described above, when the program code is run on a computer or a device. As a result, the steps of the method defined in the program code are able to be implemented by apparatuses of the computer or the device.

In the following text the present invention will be explained in greater detail by way of example with reference to the attached drawings.

DETAILED DESCRIPTION

In the following description of preferred exemplary embodiments of the present invention, identical or similar reference symbols are used for similarly acting elements shown in the various figures, and a repeated description of these elements has been omitted.

Figure 1:
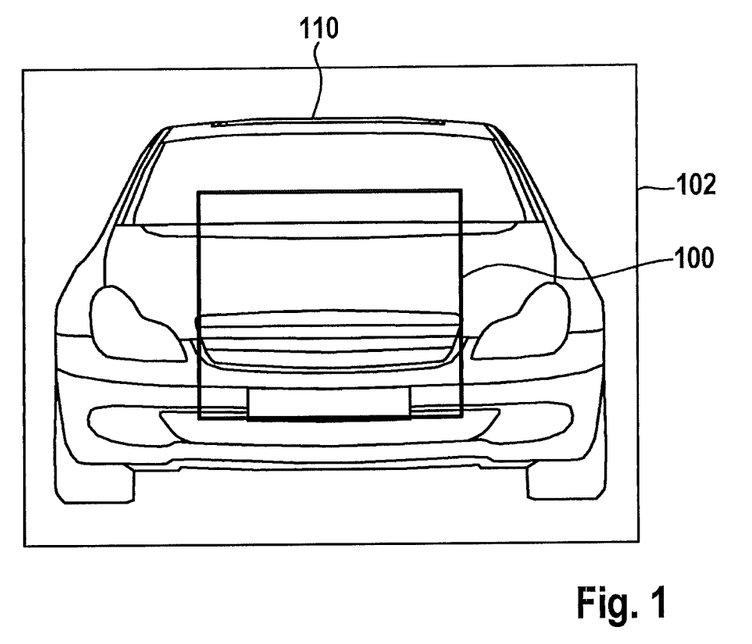
FIG. 1 a schematic representation of a cut-away portion from an image of a surrounding region of a vehicle.

FIG. 1 shows a schematic representation of a cut-away portion 100 from an image 102 of a surrounding region of a vehicle according to an exemplary embodiment of the present invention. Image 102 may be an image acquired by a sensor for stereo image recording. Image 102 images a section of road lying in front of the vehicle and an additional vehicle 110 located on the road. For example, additional vehicle 110 may be a vehicle traveling in front of the vehicle. Additional vehicle 110 may be detected by analyzing a distance image recorded by the sensor for stereo image recording. Each image pixel of image 102 illustrated in FIG. 1 may be allocated a distance value in the distance image. A distance value may represent a distance between the sensor for stereo image recording and an object section represented by the corresponding image pixel. Such distance values are able to be ascertained from a stereo image with the aid of known methods by calculating an associated disparity map.

According to this particular exemplary embodiment, cut-away portion 100 is situated in the center of image 102. For example, cut-away portion 100 may cover less than 20% of entire image 102. In this exemplary embodiment cut-away portion 100 is rectangular, such as quadratic.

A position of cut-away portion 100 within image 102 is selected in such a way that additional vehicle 110 is imaged by cut-away portion 100 if additional vehicle 110 is located at a collision-relevant distance in front of the vehicle equipped with the sensor for stereo image recording. At a collision-relevant distance, emergency braking of the vehicle may be required as a function of a relative velocity between additional vehicle 110 and the vehicle in order to avoid a collision with additional vehicle 110.

To detect additional vehicle 110 or in general an obstacle in the surrounding region of the vehicle, cut-away portion 100 of the image, hereinafter also referred to as evaluation window, is able to be analyzed. An analysis of a stereo-video disparity map allocated to image 102 may take place in the defined evaluation window.

Figure 2:
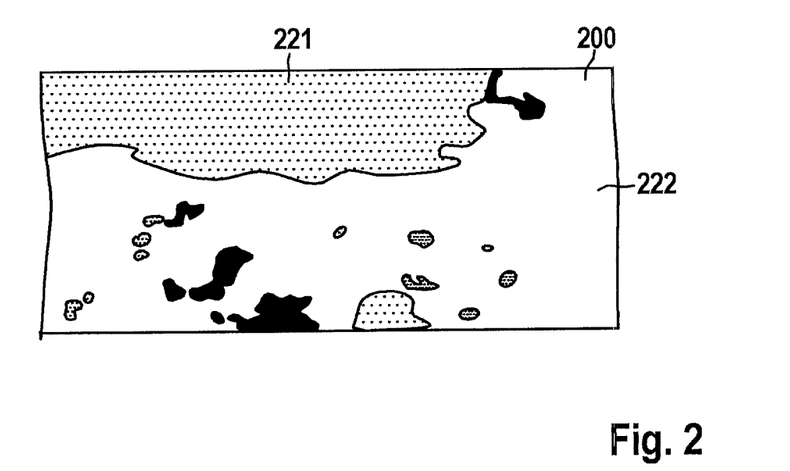
FIG. 2 a representation of a distance image.

FIG. 2 shows an illustration of a distance image 200 according to an exemplary embodiment of the present invention. Distance image 200 will also be referred to as disparity map in the following text. Distance image 200 may be based on data acquired by a sensor for stereo image recording. Distance image 200 may correspond to the cut-away portion of the illustrated image described with the aid of FIG. 1, but in a different situation of the vehicle environment. Here, a distance image 200 in the form of a "dense" disparity map is shown. The different brightness regions discernible in distance image 200 correspond to different distance values. For example, an image pixel in a region 221 may be assigned a higher distance value than an image pixel in a region 222.

Figure 3:
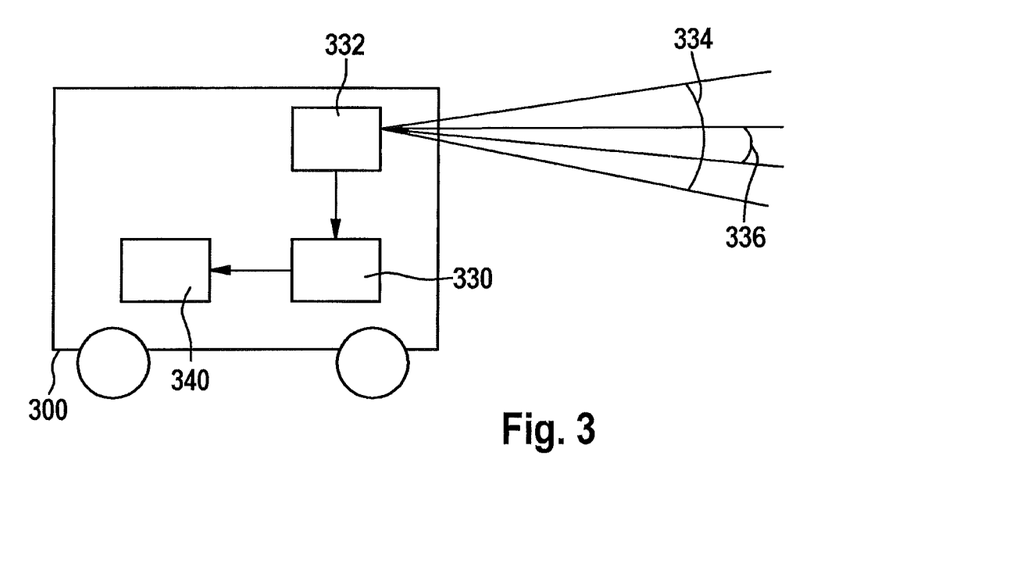
FIG. 3 a schematic representation of a vehicle having a device for monitoring a surrounding region of a vehicle.

FIG. 3 shows a schematic representation of a vehicle 300 having a device 330 for monitoring a surrounding region of vehicle 300 according to an exemplary embodiment of the present invention. Vehicle 300 has a sensor 332 for stereo image acquisition. Sensor 332 may be a stereo video sensor. Sensor 332 is developed to record an image of the surrounding region of vehicle 330 at a visual angle 334. Based on the image data acquired under visual angle 334, a distance image which includes a plurality of distance values is able to be ascertained. Such a distance image can be read in via a suitable interface by device 330 for monitoring the surrounding region of vehicle 300. Based on a cut-away portion of the distance image, an obstacle located within the surrounding region of vehicle 300 is detectable if it is present in the region of the distance image covered by the cut-away portion. Device 330 is developed to detect such an obstacle based on the cut-away portion of the distance image, and to ascertain a value for an existence measure that may represent a probability of an actual existence of the obstacle. For example, the cut-away portion may be situated in the center of the distance image. The cut-away portion, for instance, may include an area of the distance image acquired by sensor 332 for stereo image recording under a visual angle 336, which covers a subregion of visual angle 334.

Device 330 may be developed to output the value for the existence measure via an interface. According to a further exemplary embodiment, device 330 is developed to further process the value of the existence measure and to determine a warning signal, e.g., based on the value for the existence measure, and to output it via a suitable interface to an optional device 340 for implementing emergency braking of vehicle 300. Device 330 thus may be part of a stereo image emergency braking system.

Figure 4:
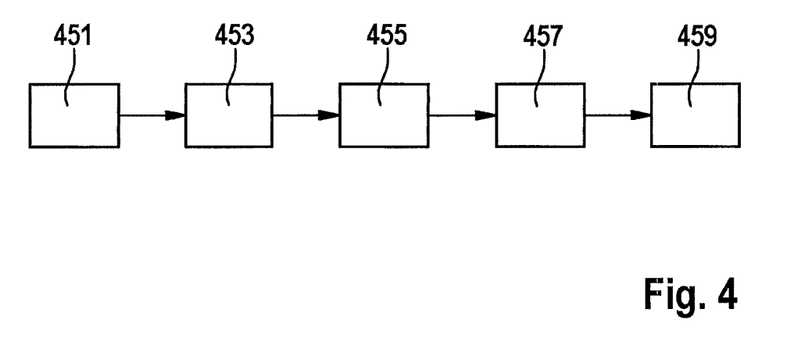
FIG. 4 a schematic representation of a device for monitoring a surrounding region of a vehicle.

FIG. 4 shows a schematic representation of a device 330 for monitoring a surrounding region of a vehicle according to an exemplary embodiment of the present invention. This may be device 330 described with the aid of FIG. 3.

Device 330 has an apparatus 451, which is designed to read in a distance image with regard to the surrounding region of the vehicle. The distance image may have been generated based on data of a sensor for stereo image recording and include a multiplicity of distance values. Each image region, such as each image pixel, of the distance image may be assigned a distance value. Device 330 furthermore includes an apparatus 453, which is designed to select a cut-away portion from the distance image. The cut-away portion may be the cut-away portion described with the aid of FIG. 3. An apparatus 455 is set up to detect an obstacle located in the surrounding region using the distance values contained in the cut-away portion. An apparatus 457 is developed to ascertain a number of relevant distance values representing distance values included in the cut-away portion which are able to be allocated to the obstacle. This may be realized by simply counting the corresponding distance values of sufficient quality. An apparatus 459 is developed to ascertain a value of an existence measure for an existence of the obstacle, i.e., using the number and quality of relevant distance values. For example, apparatus 459 may be developed to ascertain the value of the existence measure by implementing a threshold value comparison. To do so, the number and quality of relevant distance values or a ratio from the number and quality of relevant distance values and a total number of distance values of the cut-away portion or the remaining distance values of the cut-away portion may be compared to a single or multiple threshold value(s).

Figure 5:
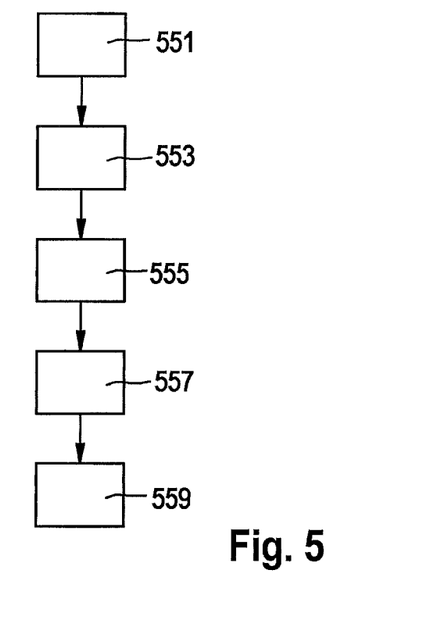
FIG. 5 a flow chart of a method for monitoring a surrounding region of a vehicle.

FIG. 5 shows a flow chart of a method for monitoring a surrounding region of a vehicle according to one exemplary embodiment of the present invention. The method may be carried out using the apparatuses of the device described with the aid of FIG. 4, for example.

The method has a step 551 of reading in a distance image pertaining to the surrounding region of the vehicle. The distance image can include a plurality of distance values, which represent the result of a multiplicity of distance measurements carried out by a sensor for stereo image recording and pertaining to the surrounding region of the vehicle sensed by the sensor. In a step 553, a cut-away portion is selected from the distance image, and in a step 555, an obstacle located in the surrounding region is detected using the distance values included in the cut-away portion if such an obstacle exists. A number of relevant distance values, which represent distance values included in the cut-away portion and are able to be allocated to the obstacle, are ascertained in a step 557. Based on the number and quality of relevant distance values, a value of an existence measure for an existence of the obstacle is determined in a step 559.

Figure 6:
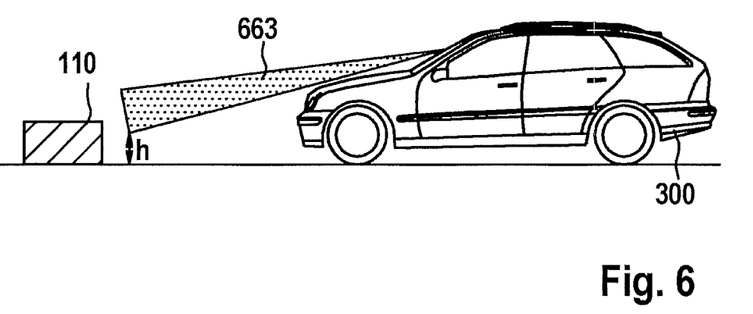
FIG. 6 a schematic representation of an obstacle in the surrounding region of a vehicle.

FIG. 6 shows a schematic representation of an obstacle 110 in the surrounding region of a vehicle 300 according to an exemplary embodiment of the present invention. For example, obstacle 110 may be an object situated on a road surface, which could pose a danger to vehicle 300 if vehicle 300 were to collide with obstacle 110.

Vehicle 300 is equipped with a device for monitoring a surrounding region of a vehicle, such as described with the aid of FIG. 4, for instance. The device for monitoring is designed to analyze a cut-away portion of a distance image. In FIG. 6, the cut-away portion of the distance image is illustrated by an opening cone 636, which represents a sub-quantity of an entire opening cone of a stereo image recording device of vehicle 300. The cut-away portion is selected in such a way that it is situated at a predefined distance from the sensor at a predefined height h above ground. Based on the cut-away portion, a collision-relevance classification may take place with the aid of a sensor, which is mounted on top of vehicle 300 in this instance.

Exemplary embodiments of the present invention will be described in detail in the following text with the aid of the preceding figures.

The possibility of setting up sensor and system models that make it possible to ascertain inadequacies and specification gaps and with regard to a set safety objective essentially depends on the complexity of the measuring or interpretation principle of the employed surround sensor system, such as a sensor 332, for example. When a surround sensor 332 which is complex in terms of its evaluation technology is involved, such as a stereo-video sensor in which a high number of source image pixels must be analyzed per time step (the typical order of magnitude is 1 million), an evaluation method is specified by which a sensor model that is relatively simple in terms of its validation capability may be set up. It is important here that the environmental object hypotheses required by the system be developed to feature the lowest complexity possible and few and comprehensible assumptions. Possibly existing limits and inadequacies, which have false positives as a result, for instance, are clearly identifiable with regard to their effect.

This is the result of a robust evaluation principle for a stereo-video sensor 332, which provides simple modelability within the afore-described meaning. The basic measuring principle of a stereo-video sensor 332 consists of calculating a disparity map 200, which basically represents a high-resolution distance image of the encompassing image region, as illustrated in FIG. 2.

In the following text, it is assumed without restricting the generality that own vehicle 300 will always be located on a drivable surface. In the large majority of cases, this will be the road surface, usually an asphalt-covered road, which is able to be monitored by a sensor 330 in the form of a stereo camera and to be reconstructed with the aid of regression methods from disparity map 200. As far as the analysis of disparity map 200 with regard to a classification task "collision-relevant object 110 is located within the driving envelope" is concerned, i.e., the classification of an object 110 as barrier, an evaluation window is specified on a centrally situated cut-away portion 100 in image 100, as illustrated in FIG. 1. A similarly "sharp" optical delimitation as in the measurement by a lidar beam is defined in this manner. In other words, a type of emulation of a lidar beam geometry is able to be implemented by analyzing a video image in a defined region 100. For example, opening cone 636 shown in FIG. 6 may be understood as an emulation of a lidar beam.

In addition to the distance of the most proximate barrier 110, a device 330 in the form of a barrier detector supplies an existence measure for a collision relevance analysis as well. It essentially indicates how many of the disparity measurements found overall in evaluation window 100 lie on barrier 110.

If the existence measure of a barrier 110 exceeds a fixedly predefined threshold value, obstacle 110 will be taken into account in connection with the triggering of an emergency braking operation in the event of a looming collision. The distance measurement of barrier 110 is performed by averaging usually a few thousand disparity values, so that a distance ascertainment of high quality is possible along the longitudinal vehicle axis. The longitudinal relative velocity as the derived quantity can be determined from this, e.g., with the aid of a Kalman filter, and be used for ascertaining the collision probability.

Owing to the described exemplary embodiments, it is possible to realize a simple and robust evaluation principle for forming object hypotheses for an emergency braking system on the basis of stereo-video sensor technology. Figuratively speaking, this integrally ascribes the measurement to a single distance window 100, similar to a time-of-flight evaluation, i.e., a long-term analysis of a single lidar beam.

A reduction in the safeguarding outlay for a system release, for instance for implementing emergency braking, is able to be achieved in that the shortcomings with regard to classification errors concerning obstacle 110, such as the occurrence of false positives, are able to be described and modeled in an excellent manner.

The exemplary embodiments described and shown in the figures have been selected merely as examples. Different exemplary embodiments are combinable with one another, either completely or with regard to individual features. An exemplary embodiment may also be supplemented by features from another exemplary embodiment. Furthermore, method steps according to the present invention may be carried out repeatedly and also performed in a sequence other than the one described.

What is claimed is:

1. A method for monitoring a surrounding region of a vehicle, the method comprising:
   reading in a distance image with the aid of a sensor for stereo image recording and pertaining to the surrounding region of the vehicle sensed by the sensor, the distance image being a disparity map;
   assigning a distance value to each pixel of the distance image based on a brightness of the corresponding pixel;
   selecting a cut-away portion from the distance image, the cut-away portion being selected based on a correspondence of the cut-away portion to an area of the surrounding region situated at a predefined height above a ground surface;
   detecting an obstacle located in the surrounding region using the distance values assigned to the pixels in the cut-away portion;
   ascertaining (i) a count of relevant distance values representing the distance values that are assigned to the pixels included in the cut-away portion and are allocate-able to the obstacle, and (ii) a quality of the relevant distance values that are assigned to the pixels included in the cut-away portion and are allocate-able to the object, wherein the distance values are relevant if the distance values lie within a predefined collision-relevant distance, and wherein the quality of the relevant distance values is a measure of a probability that the distance values lie within the predefined collision-relevant distance;
   ascertaining a value of an existence measure for an existence of the obstacle within the cut-away portion, based on the count of the relevant distance values and the quality of the relevant distance values; and
   implementing an emergency braking operation as a function of the value of the existence measure.

2. The method of claim 1, further comprising:
   supplying a warning signal if the value of the existence measure represents an actual presence of the obstacle within the cut-away portion.

3. The method of claim 2, further comprising:
   checking an emergency braking operation of the vehicle required to avoid a collision between the vehicle and the obstacle, using the warning signal.

4. The method of claim 1, wherein in the selecting, a cut-away portion situated in the center of the distance image is selected as the cut-away portion.

5. The method of claim 1, wherein in the selecting, an edge of the cut-away portion facing the ground surface is selected so that in the presence of an obstacle situated at the predefined collision-relevant distance from the sensor, the cut-away portion detects the obstacle starting from the predefined height above the ground surface.

6. The method of claim 1, wherein the value of the existence measure is determined in the ascertaining as a function of a relationship between the count of the relevant distance values and the quality of the relevant distance values and a total count of the distance values included in the cut-away portion, or a relationship between the count of the relevant distance values and the quality of the relevant distance values and a number of the other distance values included in the cut-away portion.

7. The method of claim 1, wherein the value of the existence measure is determined in the ascertaining so that the value of the existence measure indicates the actual existence of the obstacle within the cut-away portion if the number of the relevant distance values exceeds a threshold value.

8. The method of claim 1, further comprising:
ascertaining a distance from the obstacle using the relevant distance values.

9. The method of claim 8, wherein in the ascertaining, a relative velocity between the obstacle and the vehicle is ascertained using the distance.

10. A method for implementing emergency braking of a vehicle to avoid a collision or to mitigate the severity of the consequences of a collision between the vehicle and an obstacle located in a surrounding region of the vehicle, the method comprising:
monitoring a surrounding region of a vehicle to ascertain a value of an existence measure for an existence of the obstacle, by performing the following:
reading in a distance with the aid of a sensor for stereo image recording and pertaining to the surrounding region of the vehicle sensed by the sensor, the distance image being a disparity map;
assigning a distance value to each pixel of the distance image based on a brightness of the corresponding pixel;
selecting a cut-away portion from the distance image, the cut-away portion being selected based on a correspondence of the cut-away portion to an area of the surrounding region situated at a predefined height above a ground surface;
detecting an obstacle located in the surrounding region using the distance values assigned to the pixels in the cut-away portion;
ascertaining (i) a count of relevant distance values representing the distance values that are assigned to the pixels included in the cut-away portion and are allocate-able to the obstacle, and (ii) a quality of the relevant distance values that are assigned to the pixels included in the cut-away portion and are allocate-able to the object, wherein the distance values are relevant if the distance values lie within a predefined collision-relevant distance, and wherein the quality of the relevant distance values is a measure of a probability that the distance values lie within the predefined collision-relevant distance;
ascertaining a value of an existence measure for an existence of the obstacle within the cut-away portion, based on the count of the relevant distance values and the quality of the relevant distance values; and
implementing the emergency braking operation as a function of the value of the existence measure.

11. The method of claim 10, further comprising:
supplying a warning signal if the value of the existence measure represents an actual presence of the obstacle within the cut-away portion.

12. The method of claim 11, further comprising:
checking an emergency braking operation of the vehicle required to avoid a collision between the vehicle and the obstacle, using the warning signal.

13. A device for monitoring a surrounding region of a vehicle, comprising:
a reading arrangement to read in a distance image with the aid of a sensor for stereo image recording and pertaining to the surrounding region of the vehicle sensed by the sensor, the distance image being a disparity map;
an assigning arrangement to assign a distance value to each pixel of the distance image based on a brightness of the corresponding pixel;
a selecting arrangement to select a cut-away portion from the distance image, the cut-away portion being selected based on a correspondence of the cut-away portion to an area of the surrounding region situated at a predefined height above a ground surface;
a detecting arrangement to detect an obstacle located in the surrounding region using the distance values assigned to the pixels in the cut-away portion;
an first ascertaining arrangement to ascertain (i) a count of relevant distance values, which represent the distance values that are assigned to the pixels included in the cut-away portion and are allocated to the obstacle, and (ii) a quality of the relevant distance values that are assigned to the pixels included in the cut-away portion and are allocate-able to the object, wherein the distance values are relevant if the distance values lie within a predefined collision-relevant distance, and wherein the quality of the relevant distance values is a measure of a probability that the distance values lie within the predefined collision-relevant distance;
a second ascertaining arrangement to ascertain a value of an existence measure for an existence of the obstacle within the cut-away portion, based on the count of the relevant distance values and the quality of the relevant distance values; and
a brake arrangement to implement an emergency braking operation as a function of the value of the existence measure.

14. The device of claim 13, further comprising:
a signaling arrangement to supply a warning signal if the value of the existence measure represents an actual presence of the obstacle within the cut-away portion.

15. The device of claim 14, further comprising:
a checking arrangement to check an emergency braking operation of the vehicle required to avoid a collision between the vehicle and the obstacle, using the warning signal.

* * * * *